United States Patent
Dark et al.

(10) Patent No.: US 7,427,947 B1
(45) Date of Patent: Sep. 23, 2008

(54) AIRCREW AID TO ASSESS JAM EFFECTIVENESS

(75) Inventors: James Dark, Camarillo, CA (US);
James Buscemi, Camarillo, CA (US);
Scott Burkholder, Moorpark, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1 day.

(21) Appl. No.: 11/820,033

(22) Filed: May 30, 2007

(51) Int. Cl.
G01S 7/38 (2006.01)
G01S 7/40 (2006.01)
G01S 13/00 (2006.01)
G01S 7/00 (2006.01)

(52) U.S. Cl. .................. 342/173; 342/13; 342/14; 342/20; 342/89; 342/165; 342/175; 342/176; 342/180; 342/181; 342/195

(58) Field of Classification Search ............ 342/13–20, 342/89, 90, 165, 173–175, 195, 176, 180, 342/181; 455/1, 39, 67.11–67.7, 130, 269, 455/272, 278.1; 89/1.11
See application file for complete search history.

(56) References Cited

U.S. PATENT DOCUMENTS

| | | | | |
|---|---|---|---|---|
| 4,025,920 | A * | 5/1977 | Reitboeck et al. ............. | 342/13 |
| 4,194,205 | A * | 3/1980 | Willmore et al. ............. | 342/173 |
| 4,581,767 | A * | 4/1986 | Monsen .................... | 455/67.11 |
| 5,128,679 | A * | 7/1992 | Moffat ........................ | 342/13 |
| 5,278,908 | A * | 1/1994 | Parikh et al. .................... | 455/1 |
| 5,313,209 | A * | 5/1994 | Michaels et al. .............. | 342/13 |
| 5,940,033 | A * | 8/1999 | Locher et al. ................. | 342/19 |
| 6,084,540 | A * | 7/2000 | Yu .............................. | 342/17 |
| 6,476,755 | B1 * | 11/2002 | Senio et al. ................... | 342/15 |
| 6,480,139 | B1 * | 11/2002 | Hoctor ........................ | 342/13 |
| 6,704,557 | B1 * | 3/2004 | Krishnamurthy et al. .. | 455/278.1 |
| 6,748,351 | B1 * | 6/2004 | Hynes et al. .................. | 342/13 |
| 6,771,220 | B1 * | 8/2004 | Ashe et al. ..................... | 342/14 |
| 6,894,634 | B2 * | 5/2005 | Gounalis ..................... | 342/13 |
| 7,002,509 | B2 * | 2/2006 | Karlsson ...................... | 342/90 |

(Continued)

OTHER PUBLICATIONS

Nicholas DeMinco, "Engineering Manual for the Jammer Effectiveness Model"; National Telecommunications and Information Administration, Institute for Telecommunication Sciences, U.S. Department of Commerce; Boulder, Colorado, USA; Publication 95-322; Sep. 1995.*

(Continued)

*Primary Examiner*—Bernarr E Gregory
(74) *Attorney, Agent, or Firm*—Robert R. Lerma

(57) ABSTRACT

The invention generally relates to the field of computer software particularly to an improved method of providing aircrew decision aids for use in determining the optimum placement of an Electronic Attack (EA) aircraft. The core of the invention is a software program that will dynamically provide the EA flight crew situational awareness regarding a threat emitter's coverage relative to the position of the EA aircraft and to the position of protected entities (PE). The software program generates information to provide visual cues representing a Jam Acceptability Region (JAR) contour and a Jam Assessment Strobe (JAS) for display via designated aircraft cockpit processors and devices. The JAR and JAS will aid the EA aircrew in assessing the effectiveness of a given jamming approach.

18 Claims, 10 Drawing Sheets

U.S. PATENT DOCUMENTS

| | | | | |
|---|---|---|---|---|
| 7,348,919 B2 * | 3/2008 | Gounalis | ................... | 342/165 |
| 2002/0149510 A1 * | 10/2002 | Salzeder | ...................... | 342/13 |
| 2004/0130476 A1 * | 7/2004 | Gounalis | ................... | 342/13 |
| 2004/0135717 A1 * | 7/2004 | Gounalis | ................... | 342/13 |
| 2006/0164283 A1 * | 7/2006 | Karlsson | ..................... | 342/14 |

OTHER PUBLICATIONS

Nicholas DeMinco, "Jammer Effectiveness Model"; National Telecommunications and Information Administration, Institute for Telecommunication Sciences, U.S. Department of Commerce; Boulder, Colorado, USA; dated as produced in the year 2006; posted on the Internet at its.bldrdoc.gov/.*

* cited by examiner

AIRCREW AID TO ASSESS JAM EFFECTIVENESS

BACKGROUND OF THE INVENTION

1. Field of the Invention

The invention generally relates to the field of computer software particularly to an improved method of providing aircrew decision aids for use in determining the optimum placement of an Electronic Attack (EA) aircraft. The core of the invention is a software program that will dynamically provide the EA flight crew situational awareness regarding a threat emitter's coverage relative to the position of the EA aircraft and to the position of protected entities (PE). The software program generates information to provide visual cues representing a Jam Acceptability Region (JAR) contour and a Jam Assessment Strobe (JAS) for display via designated aircraft cockpit processors and devices. The JAR and JAS will aid the EA aircrew in assessing the effectiveness of a given jamming approach and assists in determining the optimum flight path for both the PE and EA. The optimized flight paths will minimize exposure to threat emitters allowing accomplishment of the mission.

2. Description of the Prior Art

Electronic Warfare (EW) tactics employed by EA aircraft strive to direct electromagnetic energy into a threat radar receiver with sufficient power to prevent the threat radar receiver from accurately detecting or tracking the PE. EW includes the basic concepts of Noise Jamming and Deception Jamming. Key to the successful jamming effort is generating a signal that exceeds the expected target return signal seen by the threat receiver and concentrating the radar jamming signal in the direction of the threat receiver antenna. Barrage noise jamming floods the threat radar receiver with massive amounts of electronic emissions and significantly degrades low technology threat receiver performance. With the evolution of advanced radar concepts the noise jamming approach is less effective against high technology threat emitters. Advanced technology threat radar emitters have led to tuning the EA jamming frequency to match the frequency of the threat emitter and to follow any frequency hopping or other frequency agile characteristics the threat emitter may employ. Deception jamming requires the EA platform to generate a signal that is similar to the target return signal the threat receiving system expects while modifying target characteristics such as return signal strength, range, heading, velocity or acceleration. Overcoming multiple threat emitters employing advanced radar techniques, while transitioning a hostile area and providing protection jamming is a high workload environment for an aircrew. Cockpit display information and aircrew decision aids are required to improve situational awareness for the EA aircrew. It is an objective of this invention to reduce aircrew workload by providing decision aids.

Systems to aid the EA flight crew decision making process in positioning the jamming source carried by the EA are in need of improvement. Current aids available to EA flight crew provide text and rudimentary visual cues depicting gross EA position relative to threat receiver position. Current EA systems force the flight crew to manually incorporate current PE position relative to the position of the EA and threat receiver, then forces the aircrew to manually determine the optimum EW countermeasure to employ driving up aircrew workload. Current systems are incapable of fusing EA jamming capability with projected threat emitter performance information in order to obtain optimal geometrical positioning of the EA relative to threat emitters. The novel method of combining threat emitter system characteristics with EA aircraft capabilities while simultaneously incorporating PE position in a single display format greatly reduces EA aircrew workload and makes the EA more effective.

SUMMARY OF THE INVENTION

The preferred embodiment is a software program to generate the information to display a Jam Acceptability Region (JAR) and a Jam Assessment Strobe (JAS) for a multitude of ground based threat emitters updated in real-time. The JAR and JAS are composed of a threat emitter system susceptibility area based on the position of the Protected Entities (PE) and the Electronic Attack (EA) position. The JAR and JAS provides the EA aircrew visual information depicting the current position of the EA aircraft in relationship to ground based threat emitters and in relationship to the accompanied PE. The PE is the aircraft in need of protection jamming. Electronic Warfare (EW) employs tactics to direct electromagnetic energy into the enemy radar receiver to prevent the receiver from accurately detecting the PE. Key to successful radar jamming is obtaining the proper Signal to Noise (S-N) ratio threshold. One of the most critical factors in achieving this S-N ratio is placing the EA jamming signal in the correct geometric position to blind the threat receiver while the threat antenna is slewed in the direction of the PE. The Jam Assessment software program that is the preferred embodiment of this invention is a real-time software application that will be employed by the EA aircrew during prosecution of their tactical mission. The Jam Assessment software program provides the aircrew with visual cues that enable the flight crew to ascertain current jamming effectiveness. The Jam Assessment software program receives as input EA and PE positional information. The performance characteristics of the threat emitter and EA jamming capabilities are also received as input to the Jam Assessment software program. The information received as input is processed by designated computers on board the EA aircraft and used to generate the visual cues that allow an assessment of jam effectiveness.

For the EA to determine its instantaneous optimum position it must continually ascertain the position of the PE in relationship to each threat emitter and mathematically generate a JAR along with its own position within the JAR. The Jam Assessment software program must account for the interaction of the JAR and the PE position as the PE transits its intended flight path. The Jam Assessment software program blends the position of the EA aircraft and PE aircraft with the information residing in an electronic library designated as an Electronic Order of Battle (EOB). The positional and EOB information are used to generate the visual cues that allow an assessment of jam effectiveness.

The Jam Assessment software program has at its core a JAR processing algorithm executed on designated aircraft computers driving designated display hardware to provide the aircrew with improved situational awareness using visual cues in the form of JAR and JAS symbols.

DETAILED DESCRIPTION OF THE PREFERRED EMBODIMENT

Figure 1:
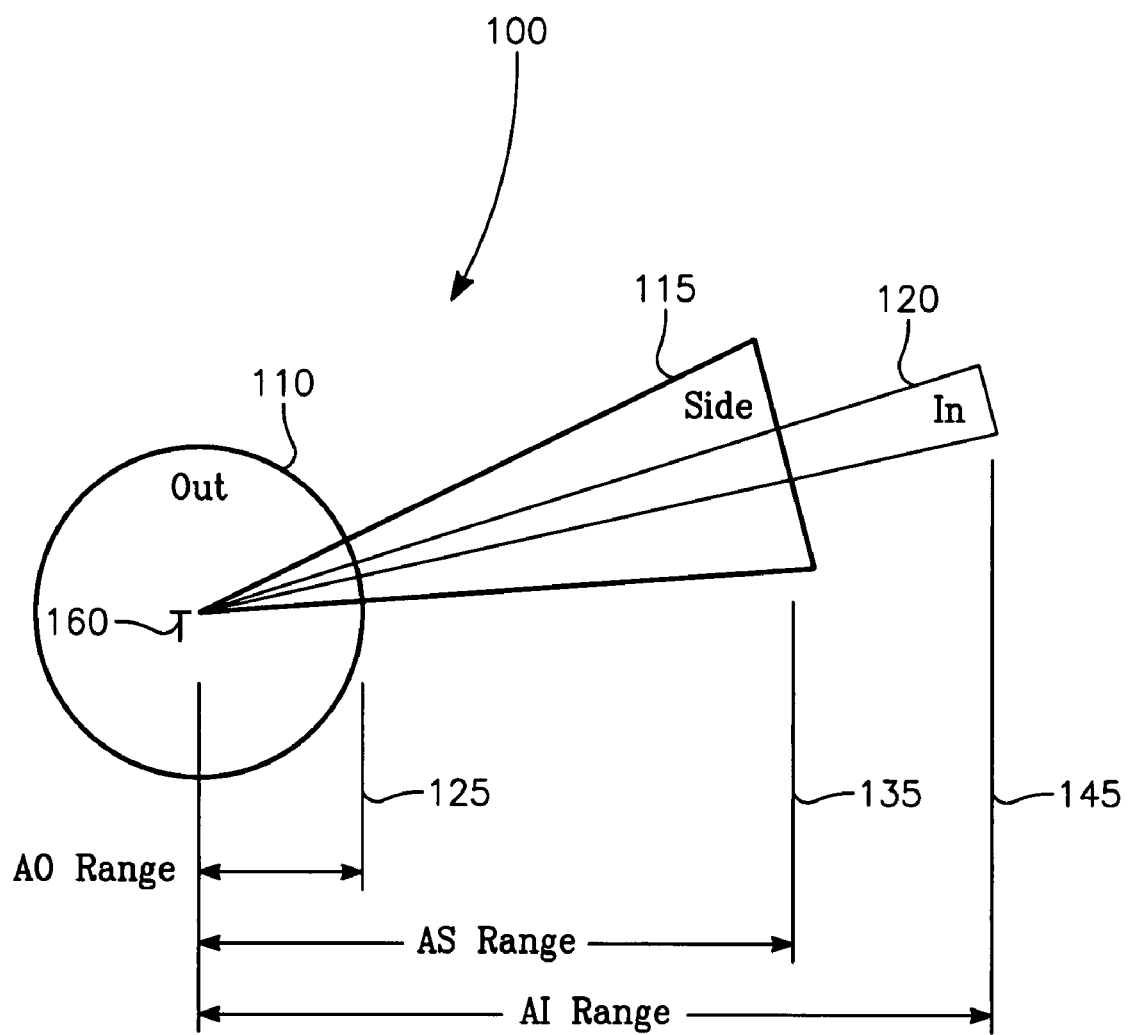
FIG. 1 is a drawing showing the various Jam Acceptability Region (JAR) contours.

Broadly stated, the present invention comprises a method and software module that efficiently and simultaneously receives disparate information and transforms the disparate information into usable graphical displays. The graphical displays convey information that is used to position the EA relative to a threat emitter system. A typical threat emitter system is composed of an antenna, a transmitter, a receiver, a mechanism to position the antenna, electronics to process information received and a user interface. Key to the success of any radar jamming technique is exceeding the Signal to Noise ratio threshold that is an inherent characteristic of the threat emitter system. When the noise signal generated by the EA exceeds the signal return of the PE you have defeated the threat emitter system. Likewise, if the EA generates a stronger yet similar signal to the actual return signal of the PE while shifting a PE parameter, such as range or speed, the threat emitter system will be deceived, masking the true position of the PE. Generating a jamming signal to mask the true position, speed or course of the PE degrades acquisition and tracking performance in the threat emitter system.

Generally, threat radar coverage is viewed as the instantaneous threat radar volume swept vertically and horizontally over time through azimuth and elevation limits defined by the threat radar antenna mount. Multiple three-dimensional concentric ellipsoids extend from the transmitting antenna and compose the threat radar volume. The threat radar volume is composed of a main-lobe ellipsoid, numerous side-lobe ellipsoids and numerous back-lobe ellipsoids. The main-lobe ellipsoid extends much farther than any side-lobe ellipsoid or back-lobe ellipsoid. The main-lobe ellipsoid is the primary beam that is swept across a target to generate a return signal strong enough to be detected by a threat receiver. One critical factor in successful radar jamming is placing the jamming signal emitted by the EA in a position to enter the threat receiver via the threat antenna while the threat antenna is slewed in the direction of the PE.

In addition to the geometric relationship (bearing relationship) of the EA and the PE to the threat emitter system other factors also determine the effectiveness of the threat emitter system. The other factors are the jamming technique and the jamming tactic employed by the EA. Two representative jamming techniques are Preemptive Assignment (PA) and Reactive Assignment (RA). The PA technique is invoked when the threat emitter characteristics and threat emitter location are known before the mission is undertaken. The RA technique is employed when an unexpected threat emitter or threat emitter wave form are encountered during a mission requiring the EA to adapt to the threat. Generally, the PA technique results in Jam Acceptability Region (JAR) contours that are smaller in area and shorter in range relative to the JAR contours associated with the RA technique. A JAR is defined as the family of positions an EA may occupy and still provide effective jamming to protect the PE. The difference in area and range, PA relative to RA, is attributed to the relationship of bandwidth to power. When an EA jams the entire known PA bandwidth for a planned threat emitter lower EA jam power is applied to any specific threat emitter frequency. When the EA detects a threat emitter the RA jamming power may be narrowed into a band focused on the frequency of interest resulting in a JAR that has a larger area and a longer range, relative to the PA JAR.

Three representative jamming tactics are associated with three JAR contours, irrespective of activating either a PA or an RA technique. Referring to FIG. 1, two dimensional depictions of the three dimensional JAR contours are Out of Alignment (O) 110, In Side-Lobe Alignment (S) 115 and In Main-Lobe Alignment (I) 120. The Out of Alignment tactic 110 means the jamming asset can be geographically located anywhere within a hemispherical region centered at the threat emitter and will remain effective in protecting the PE. This is by-far the simplest tactic. The center of JAR 110 represents the location of threat emitter system 160. A disadvantage of the Out of Alignment tactic is that the EA must be close in range 125 to the threat antenna in order to impart adequate energy to exceed the threat receiver signal to noise ratio, regardless of the direction of arrival of the EA jamming signal. To overcome this range vulnerability the S or I tactic is used. Using either the S or I tactic necessitates maintaining a stringent geometric relationship between the EA and the PE to the threat emitter system.

The S tactic results in a conically shaped JAR directly related to the side lobe radiation pattern of the threat emitter antenna. The EA is effective anywhere within JAR 115 provided the EA does not exceed the AS range 135.

Successful jamming of the threat emitter system using the S tactic requires the EA to be within the side-lobe volume of the threat emitter while the main lobe of the threat emitter volume encompasses the PE. While the S tactic increases the standoff range for the EA, relative to the O tactic, the EA is effective only while maintaining the geometric relationship to the PE and to the threat emitter.

The I tactic results in a conically shaped JAR directly related to the main lobe radiation pattern of the threat emitter antenna. A two dimensional depiction of the conically shaped JAR contour is depicted in FIG. 1 item 120. The EA is effective anywhere within JAR 120 provided the EA does not exceed I range 145.

The I tactic provides an improved EA stand off range from the threat antenna but requires that a stringent geometric relationship be maintained between the EA and PE to the threat antenna. The I tactic requires that the EA and PE are in alignment while the threat antenna main-lobe volume encompasses the PE, hence the narrowness of JAR 120.

Each of the techniques and tactics are combined in all permutations to produce a set of jamming approaches to degrade the performance of the threat emitter system. The jamming approaches are: Preemptive Assignment—Out of Alignment (PAO), Preemptive Assignment—In Side-Lobe Alignment (PAS), Preemptive Assignment—In Main-Lobe Alignment (PAI), Reactive Assignment—Out of Alignment (RAO), Reactive Assignment—In Side-Lobe Alignment (RAS), and Reactive Assignment—In Main-Lobe Alignment (RAI).

A given EA jamming approach has a determinable impact upon the threat emitter radar coverage. The JAR represents a volume of space in which the EA may position itself to provide effective jamming to mask the PE or deceive the threat emitter system regarding the true course and speed of the PE. Generating the JAR, assessing jamming effectiveness, determining optimum positioning of the EA and conveying this information to the EA aircrew are objectives of this invention.

Figure 2:
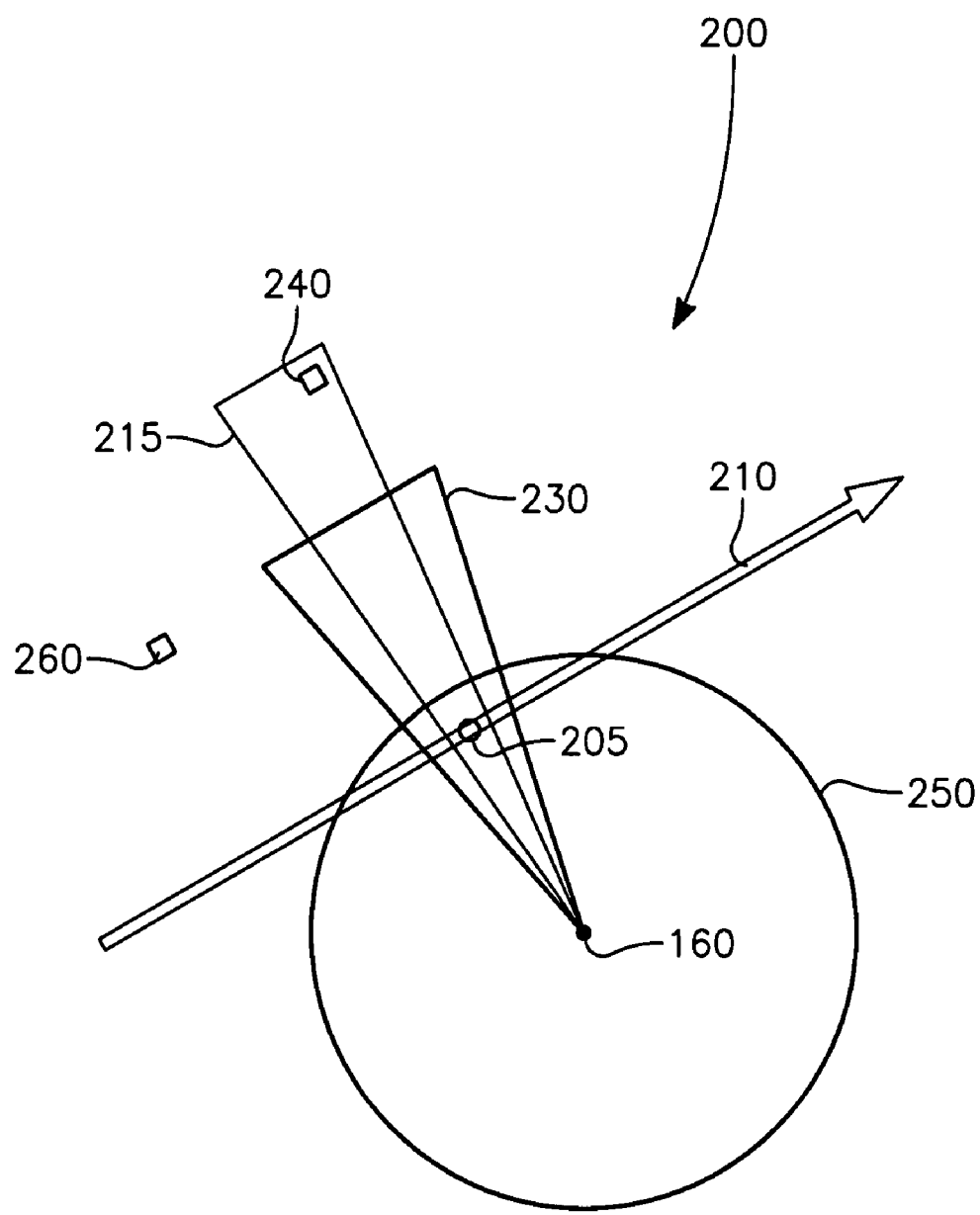
FIG. 2 is a drawing showing the relationships between the JAR, the threat emitter system, the EA and the PE flight path.

Referring to FIG. 2, JAR volumes for PAO-JAR 250, PAS-JAR 230 and PAI-JAR 215 are represented as two dimensional JAR areas. A JAR defines an area in which an EA may position itself for a given jamming approach and provide protective jamming to the PE. As PE 205 progresses along its flight path 210, PAI-JAR 215 and PAS-JAR 230 will remain centered on PE 205. The EA 240 must maintain its position within PAI-JAR 215 and move along with PAI-JAR 215 while jamming threat emitter system 160 using the PAI jamming approach. Positioning EA 240 in the corner of PAI-JAR 215 places EA 240 farthest from threat emitter system 160, optimum for EA safety while providing protective jamming. As another example, EA 260 is the sole EA and is positioned outside of JAR contours 250, 230 and 215. EA 260 would be ineffective in jamming threat emitter 160 regardless of the jamming approach employed resulting in threat emitter system 160 detecting and tracking PE 205. PE 205 is now vulnerable to attack.

Optionally, placing the EA 240 within PAS-JAR 230 would enable the PAS jamming approach that would provide adequate protection for PE 205. It should be noted that the PAS jamming approach would place the EA 240 closer to the threat emitter 160.

Optionally, placing the EA 240 within PAO-JAR 250 would enable the PAO jamming approach that would provide adequate protection for PE 205. It should be noted that the PAO jamming approach would place the EA 240 even closer to the threat emitter 160.

Figure 4:
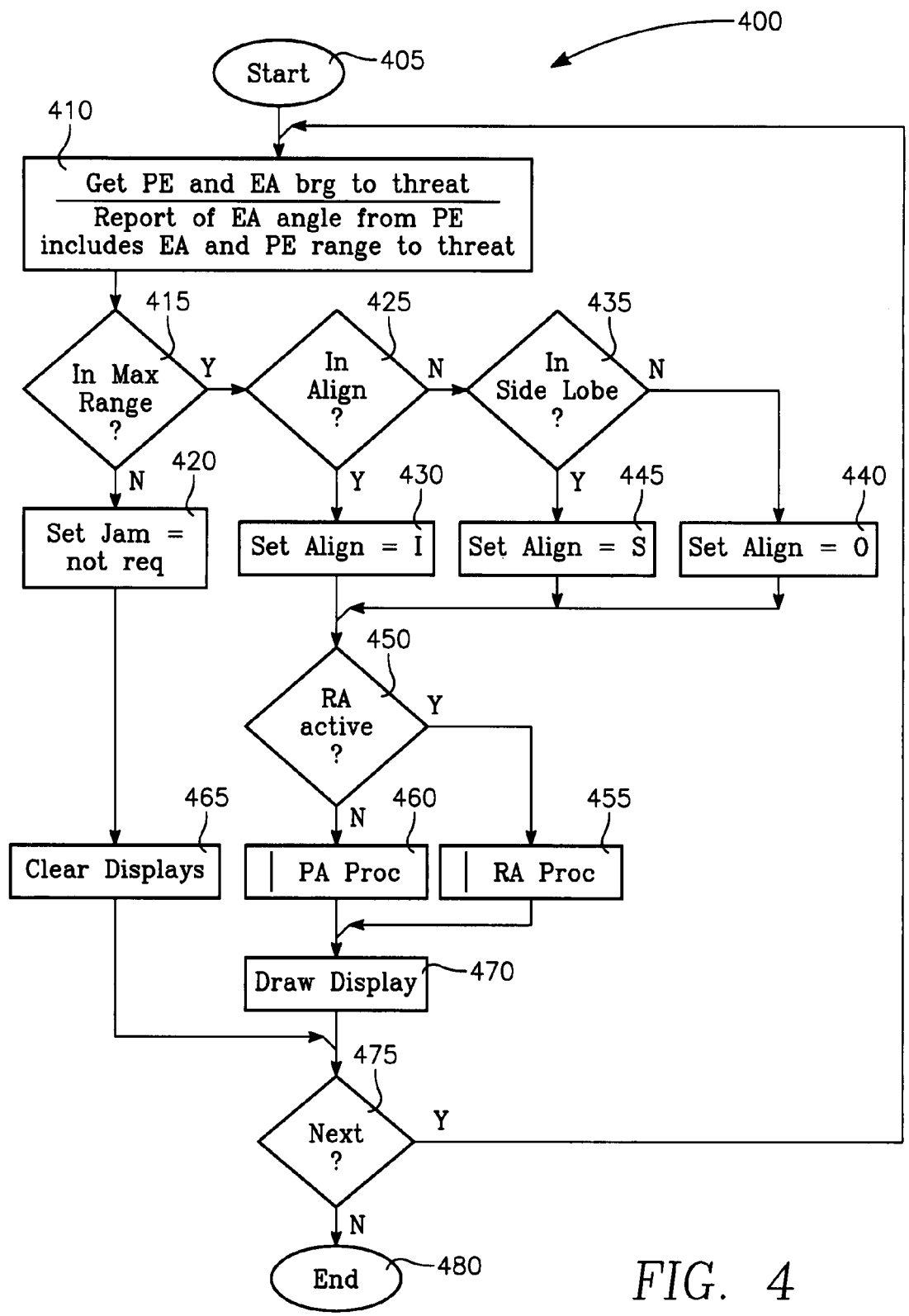
FIG. 4 is a high level software flowchart showing the processing steps for generating the Reactive Assignment and the Preemptive Assignment JAR contours and Jam Assessment Strobe (JAS) displays.

FIG. 4 is a flowchart describing the software processing steps necessary to generate Jam Assessment displays. After program initialization is complete program execution begins, item 405. Own aircraft navigational parameters for the PE and the EA are read into memory buffers where the information is used to initialize navigational parameters. The navigational parameters are provided by a designated suite of aircraft equipment specialized to provide latitude, longitude, aircraft attitude, speed and course. An Electronic Order of Battle (EOB) is a an electronic library of information functioning as a database of information related to the characteristics and locations for threat emitter systems likely to be encountered on a given mission, the expected flight path of the PE and the jamming capabilities of the EA. The EOB is generated during the planning phase of a mission and is derived from sources of intelligence specific to the theater of operation. The EOB is downloaded into computer memory residing in the existing suite of aircraft equipment and is made available to the Jam Assessment software program via designated aircraft interfaces and computers. Both the navigational information and the EOB information are used in processing step 410 to determine the PE and EA bearing to the threat emitter and to determine whether the PE lies within the range of the threat emitter system. Processing step 410 is performed with the assumption that the threat emitter is functioning according to the EOB data and the EA is not radiating a jamming signal.

Relying on the bearing relationships between the EA and PE to the threat emitter and the maximum range of the threat emitter, the software performs a check 415 to determine if the PE is within the maximum range of the threat emitter. If the PE is not within the range of the threat emitter a no jam required flag is set 420, the displays are cleared of stale information in step 465, then step 475 determines program end 480 or directs program control to step 410 for a subsequent iteration.

If the PE is within range of the threat emitter, step 425 determines the alignment of the EA, PE and threat emitter. If the result of alignment check 425 is that the EA, PE and threat emitter are in alignment then a flag is set 430 to "I". If alignment check 425 returns an out of alignment result then a side lobe check is made at step 435. If the side lobe check 435 result is positive for the PE being within the side lobe then the alignment flag is set to "S" 445. If the side lobe check 435 is negative the assumption is the EA, PE and threat emitter are Out of alignment and the alignment flag is set to "O" 440.

Figure 5:
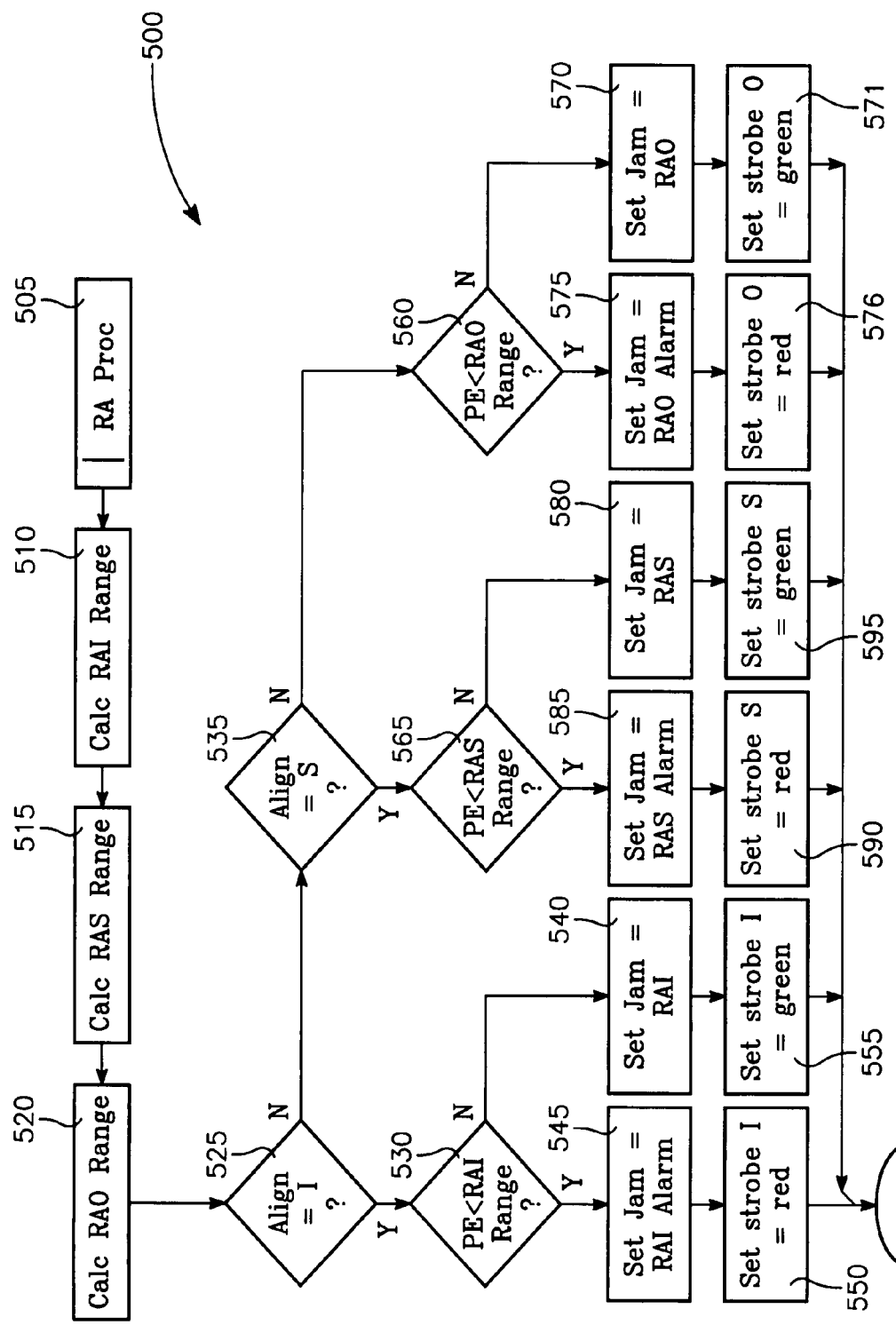
FIG. 5 is a lower level flowchart focusing on the processing steps to generate the Reactive Assignment JAR and JAS information.
Figure 6:
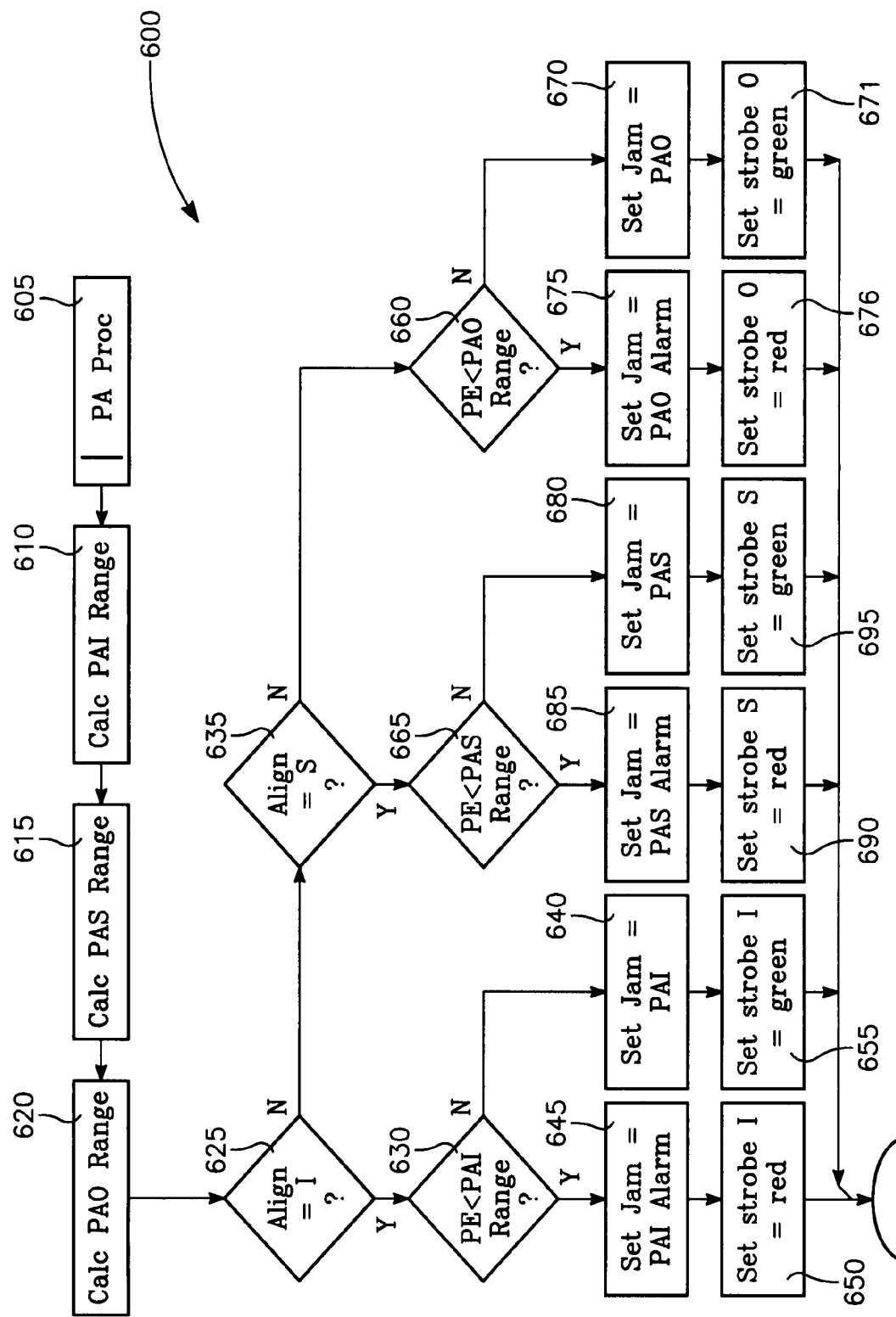
FIG. 6 is a lower level flowchart focusing on the processing steps to generate the Preemptive Assignment JAR and JAS information.

The software must now determine whether to invoke RA processing or PA processing. The software then checks for activation of RA 450, a check to determine whether the EA has detected a threat emitter waveform. If the result of RA 450 check is positive, the threat emitter is not in the EOB, then RA processing 455 is called. Refer to FIG. 5 for a high level flowchart describing RA processing or the detailed description below. If the result of RA 450 check is negative, the threat emitter is in the EOB, then PA processing 460 is called. Refer to FIG. 6 for a high level flowchart of describing PA processing or the detailed description below. Both RA and PA processing routines return to the same software control point in FIG. 4, a call to draw the displays 470. The displays convey information related to overall EA jamming effectiveness and relative location of the PE and EA to the threat emitter. Step 475 then determines program end 480 or directs program control to step 410 for a subsequent iteration.

Referring to FIG. 4 several flags (steps 440, 445 and 430) correspond to the alignment of the PE and the threat emitter. These flags are common to RA 455 and to PA 460 processing routines and must be set prior to calling either RA or PA processing routines.

Referring to FIG. 5, when RA processing is invoked in step 455 (FIG. 4) program flow is routed to step 505 (FIG. 5) and RA processing 505 begins. RA processing determines RAI range 510 by running the Jammer and Tactics Optimization (JATO) power equation 1-1 with the variables and constants set for the RAI jamming approach. RAS range 515 is determined by running JATO power equation 1-1 with the variables and constants set for the RAS jamming approach. RAO range 520 is then determined by running JATO power equation 1-1 with the variables and constants set for the RAO jamming approach. The variable definitions and constants used in equation 1-1 are based on the critical threat attribute parameters residing in the EOB, real time own aircraft navigational information from the PE and EA aircraft and the characteristics of the specific RA jamming approach.

The limits of threat emitter coverage, in the presence of jamming, obtained from the JATO power equation yield a JAR contour. The constants and variable definitions for the JATO power equation 1-1 are provided below.

$$R_{\max} = \quad \text{JATO Equation 1-1}$$

$$\left\{ \frac{P_R \cdot G_{RT}^2 \cdot \sigma \cdot \lambda^2 \cdot G_m \cdot G_i}{(4\pi)^3 \cdot (S/N)_{\min} \cdot L_{RX} \cdot L_{TX} \cdot L_{rp} \cdot} \right.$$

$$\left. B_R \cdot \left[ k \cdot T \cdot N_f + \left(\frac{\lambda}{4\pi}\right)^2 \sum_{i=1}^{N} \left( \frac{P_J \cdot G_{JR} \cdot G_{RJ}}{R_J^2 \cdot B_J} \cdot \frac{\Delta M}{L_P \cdot L_J \cdot L_{RX}} \right) \right] \right\}^{\frac{1}{4}}$$

where:

$R_{max}$=Maximum effective range for a threat emitter
$P_R$=Receiver Power
$G_{RT}$=Receiver Antenna Gain
$\sigma$=Radar Cross Section
$\lambda$=Wavelength
$G_m$=Modulation Gain
$G_i$=Integration Gain
S/N=Signal to Noise Ratio
$L_{RX}$=Receiver Loss
$L_{TX}$=Transmitter Loss
Lrp=Receiver Processing Loss
$B_R$=Receiver Bandwidth
$k \cdot T \cdot N_f$=constant for transmission noise figure
$P_J$=Jammer Power
$G_{JR}$=Jammer Receiver Antenna Gain
$G_{RJ}$=Jammer Receiver Gain
$R_J$=Range of Jammer
$B_J$=Jammer Bandwidth
$\Delta M$=Modulation Change
$L_P$=Jammer Processing Loss
$L_J$=Jammer Loss The accuracy of $R_{max}$ is dependent upon the accuracy of the critical threat attribute parameters drawn from the EOB, the positional information of the threat emitter system, the positional information of the EA and the EA jamming approach parameters.

Equation 1-1 is a variation of the well known radar range equation. Equation 1-1 is invoked for each jamming approach, for each threat emitter, and for changing PE and EA positions.

FIG. 5 further describes the steps necessary to assemble a JAS representing the RA-JAR information. The In alignment flag (I) is checked at step 525 (FIG. 5). If the I flag is set then a check 530 is made to determine whether the PE is within the RAI range of the threat emitter. If the PE is within range of the threat emitter the Jam flag is set to RAI alarm 545, the JAS color is set to red 550 and the RA routine is exited 598. If the PE is not within the range of the threat emitter then the Jam flag is set to RAI 540 and the JAS color is set to green 555 and the RA routine is exited 598. If the I flag was not set then the Side lobe (S) alignment flag is checked 535.

If the S flag is set then a check 565 is made to determine whether the PE is within the RAS range of the threat emitter. If the PE is within range of the threat emitter the Jam flag is set to RAS alarm 585, the JAS color is set to red 590 and the RA routine is exited 598. If the PE is not within the range of the threat emitter then the Jam flag is set to RAS 580 and the JAS color is set to green 595 and the RA routine is exited 598.

If the S flag was not set then the alignment must be Out of alignment (O). A check 560 is made to determine whether the PE is within the RAO range of the threat emitter. If the PE is within range of the threat emitter the Jam flag is set to RAO alarm 575, the JAS color is set to red 576 and the RA routine is exited 598. If the PE is not within the range of the threat emitter then the Jam flag is set to RAO 570 and the JAS color is set to green 571 and the RA routine is exited 598.

FIG. 6 describes the steps necessary to assemble a JAS representing the PA-JAR information. After calculating the PAI range 610, the PAS range 615 and the PAO range 620 the in alignment flag (I) is checked at step 625. If the I flag is set then a check 630 is made to determine whether the PE is within the PAI range of the threat emitter. If the PE is within range of the threat emitter the Jam flag is set to PAI alarm 645, the JAS color is set to red 650 and the PA routine is exited 698. If the PE is not within the range of the threat emitter then the Jam flag is set to PAI 640, the JAS color is set to green 655 and the RA routine is exited 698. If the I flag was not set then the Side lobe (S) alignment flag is checked 635.

If the S flag is set then a check 665 is made to determine whether the PE is within the PAS range of the threat emitter. If the PE is within range of the threat emitter the Jam flag is set to PAS alarm 685, the JAS color is set to red 690 and the PA routine is exited 698. If the PE is not within the range of the threat emitter then the Jam flag is set to PAS 680 and the JAS color is set to green 695 and the PA routine is exited 698.

If the S flag was not set then the alignment must be Out of alignment (O). A check 660 is made to determine whether the PE is within the PAO range of the threat emitter. If the PE is within range of the threat emitter the Jam flag is set to PAO alarm 675, the JAS color is set to red 676 and the PA routine is exited 698. If the PE is not within the range of the threat emitter then the Jam flag is set to PAO 670 and the JAS color is set to green 671 and the PA routine is exited 698.

Referring to FIG. 4, RA 455 and PA 460 processing routines return control to the draw display routine 470 providing the information necessary to draw the JAR and the JAS. The information to draw the JAR and JAS is in a format suitable for further processing by the designated aircraft display processor. Once the boundaries of the JAR contours and jamming effectiveness are determined any number of user defined displays may be used to present the information to the EA aircrew.

Typical displays are JARs with PE and EA positions plotted with respect to their last known or extrapolated position and a color coded Jam Assessment Strobe (JAS) indicating jamming effectiveness. The length of the JAS represents the maximum effective range for a threat emitter experiencing EA jamming. Each jamming approach (RAO, RAI, RAS, PAO, PAS, PAI) affects the maximum detection range of the emitter adversely. Color coding the JAR contours and JAS is a user preference and is limited by the display processor and the properties of the display hardware residing in the EA aircraft.

Figure 3:
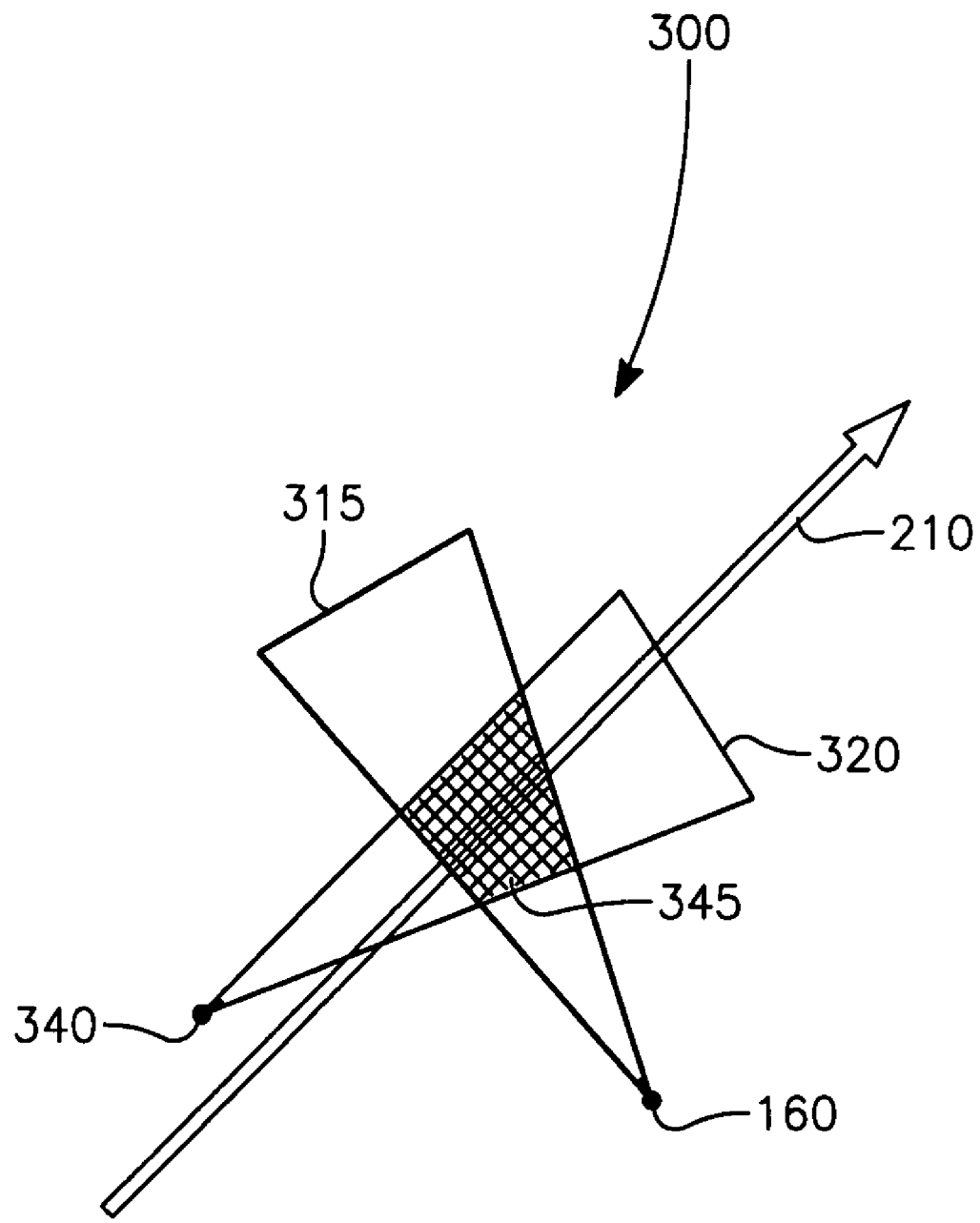
FIG. 3 is a drawing showing multiple threat emitter systems and the JAR overlap area.

In the event multiple threat emitters have overlapping coverage the overlap volume can be determined. Refer to FIG. 3 for a two dimensional representation of the JAR overlap volume for two threat emitters. Threat emitter 160 is associated with JAR 315 while threat emitter 340 is associated with JAR 320. Each point within every JAR has a three dimensional coordinate corresponding to latitude, longitude and altitude. Using EOB data for azimuth and elevation scan limits, the maximum effective range of emitter coverage, positional information describing the latitude, longitude and altitude for a given threat emitter, allows points in common between multiple JARs to be compared. The comparison of JAR points results in common points between the JARs to be identified and used to define an overlap in threat emitter coverage areas. Plotting EA flight path 210 through the threat emitter coverage allows assessment of the EA position with respect to jamming effectiveness. This method of determining the JAR overlap area can be expanded to include any number of threat emitters having overlapping coverage and is only limited by the processing throughput of the interfaces and computers in the EA aircraft.

Figure 7:
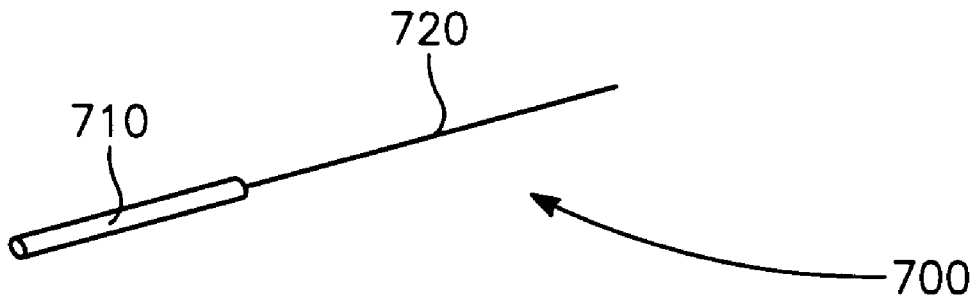
FIG. 7 is a drawing showing the segments that make a JAS.

Referring to FIG. 7, segment 710 represents the current effective (Jammed) range, and segment 720 represents the un-jammed range of the threat emitter. The JAS orientation represents the geometric relationship between the PE and the threat emitter.

Figure 8:
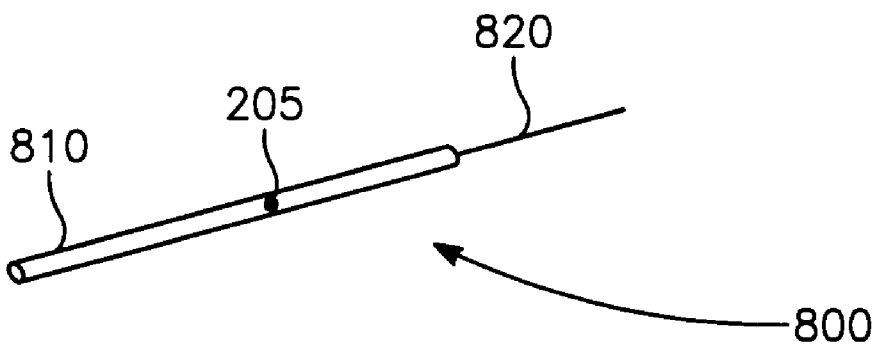
FIG. 8 is a drawing showing JAS and a PE that is detectable by a threat emitter system.

Referring to FIG. 8, JAS 810 has a length that passes through PE 205 indicating that PE 205 is within the detection range of the threat emitter. JAS 810 would be color coded to indicate that PE 205 is not vulnerable to attack because jamming is effective. FIG. 8 represents the scenario in which the EA is effective despite the PE position within the PAI range of the threat emitter. In the event that PE 205 drifts into line segment 820 which results in jamming not being effective, the EA aircrew is prompted to either: maneuver to address the threat, use other tactical options such as change jam techniques, deploy a kinetic weapon, or advise the PE to maneuver further away from the threat.

Figure 9:
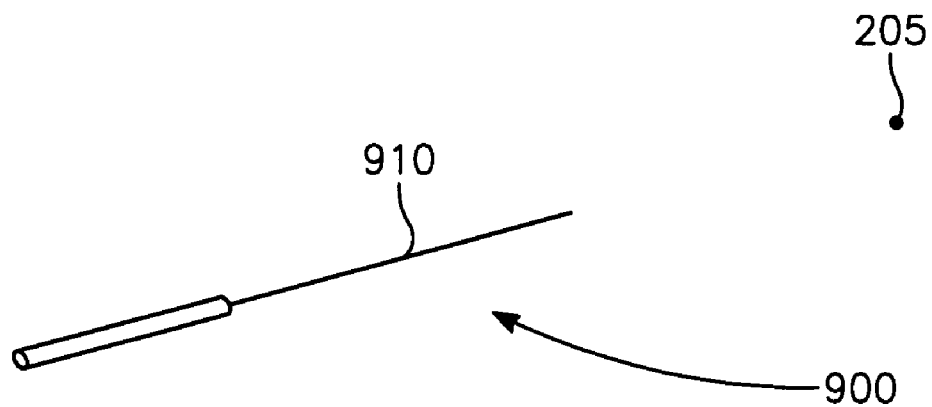
FIG. 9 is a drawing showing a JAS and a PE that is not detectable by a threat emitter system.

Referring to FIG. 9, JAS segment 910 has a length that is short of PE 205 indicating that PE 205 is not within the detection range of the threat emitter. JAS 910 would be color coded to indicate that PE 205 is not vulnerable to attack.

Figure 10:
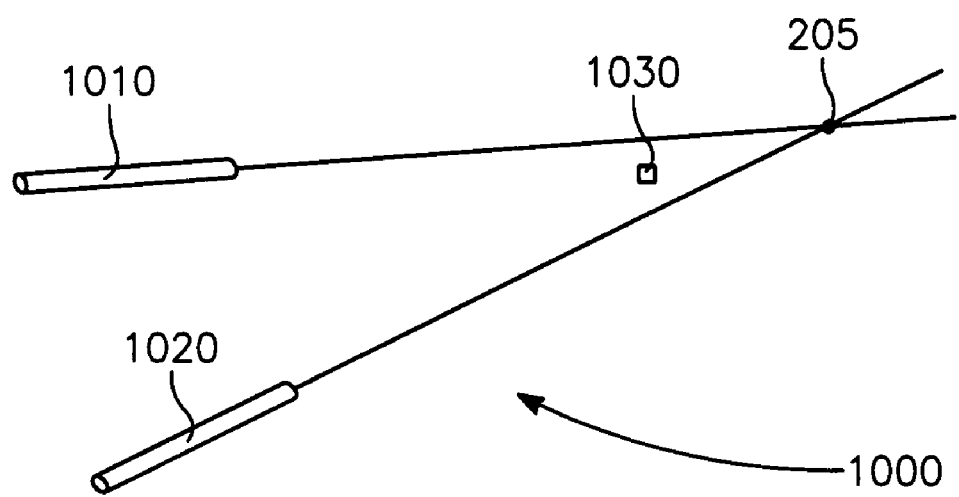
FIG. 10 is a drawing showing two JAS, an effective EA and a protected PE in a representative display format.

Another embodiment of this invention generates a display format as depicted in FIG. 10. JAS 1010 and JAS 1020 represents jamming employed by EA 1030 which is positioned in the JAR overlap area of the two threat emitters. In this configuration JAS 1010 and JAS 1020 would be color coded green indicating that PE 205 is not vulnerable to detection by either threat emitter.

Figure 11:
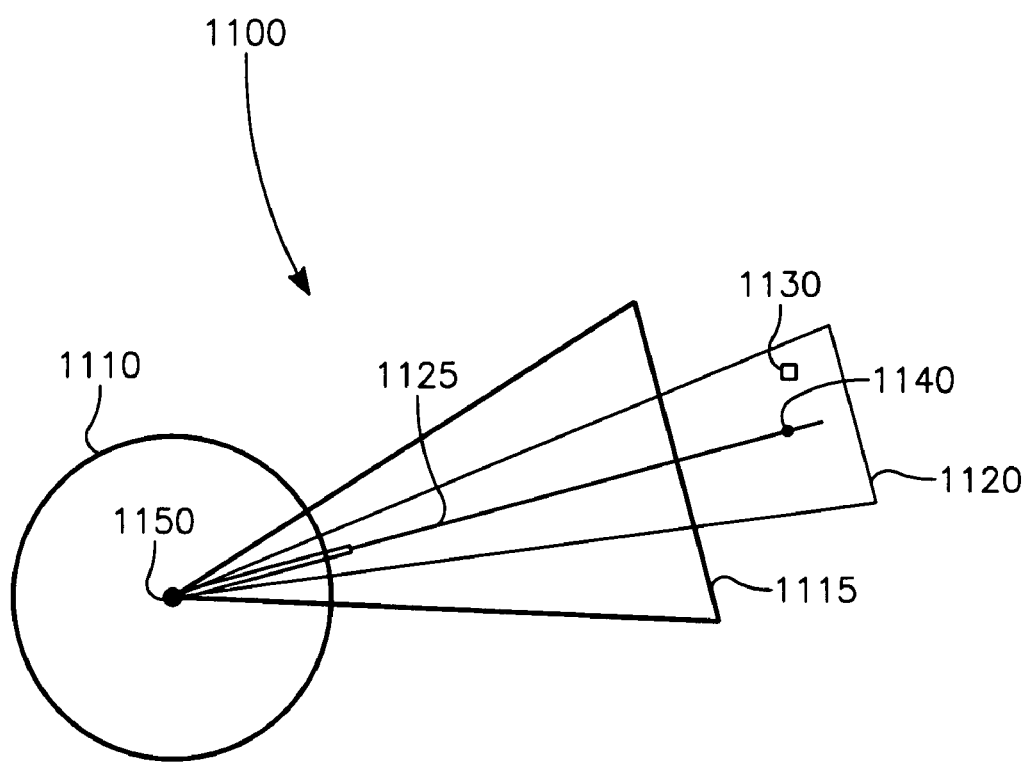
FIG. 11 is a drawing of a combined JAR, JAS, EA and protected PE in a representative display format.

FIG. 11 depicts another display embodiment combining the JAR and JAS information with the relative positions of EA 1130 and PE 1140. The explanation for FIG. 11 is applicable to either the PA or RA jamming technique. Assume EA 1030 is positioned within the In alignment JAR 1120 employing the PAI jamming approach. JAS 1125 calculated for the PAI jamming approach falls short of PE 1140 and would be colored green indicating that PE 1140 is not vulnerable to attack. At a glance the aircrew can determine that PE 1140 is safe from detection by threat emitter 1150 and that EA 1130 could maneuver anywhere within JAR 1120 while employing PAI jamming and remain effective in protecting PE 1140. Equally important, is the situational awareness that shifting to the PAS jamming approach and maneuvering EA 1130 into JAR 1115 would provide adequate protection for PE 1140. Equally important is the situational awareness that shifting to PAO jamming and maneuvering into JAR 1110 would also provide protection for PE 1140. FIG. 11 provides critical information to the EA aircrew in a format that is easy to understand, is used to ascertain jamming effectiveness and improves the ability to adapt to changing conditions. The capability to assess jam effectiveness as described in the preferred embodiment fills a need unmet by the current aircraft displays.

Figure 12:
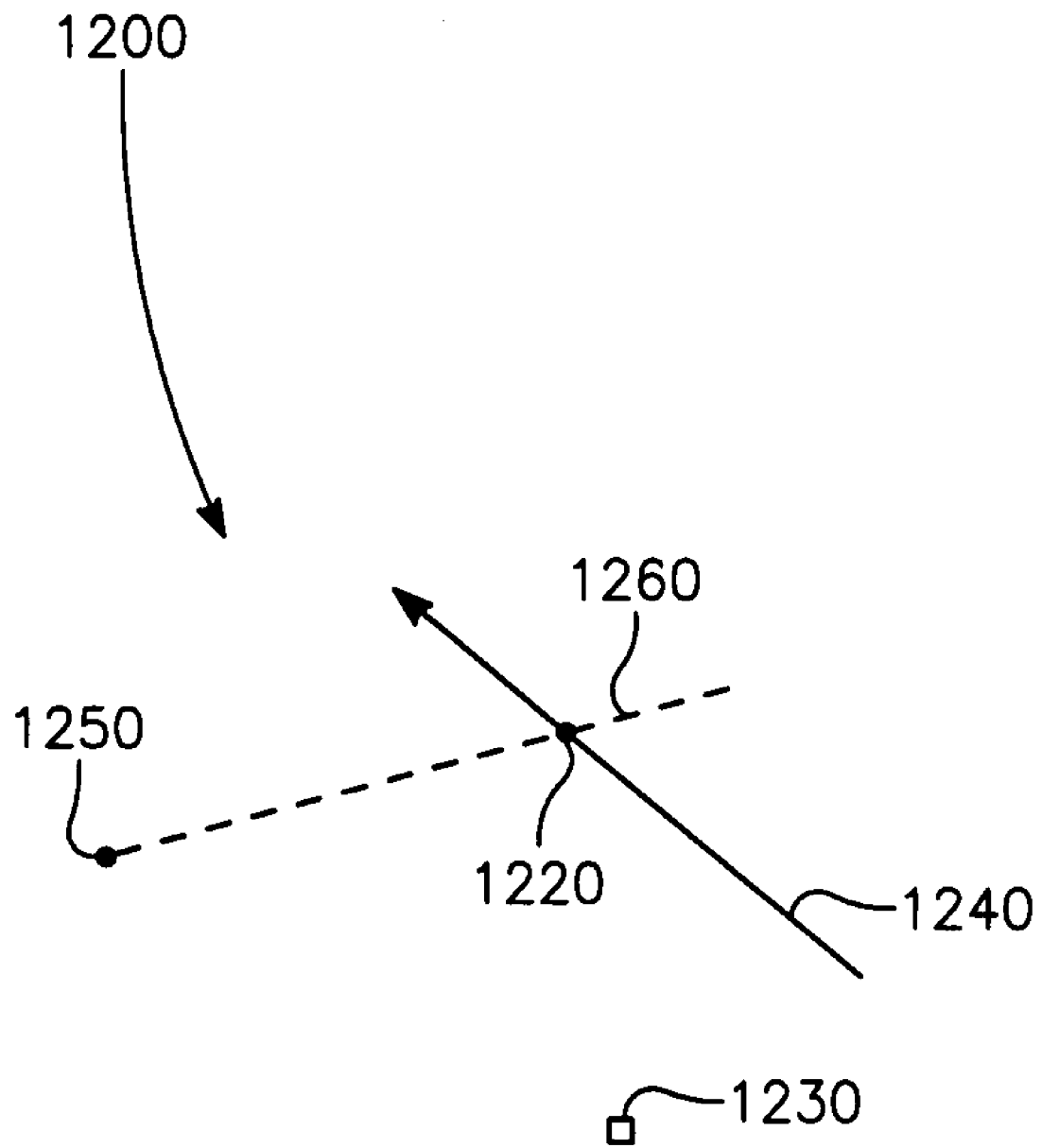
FIG. 12 is a drawing of undesignated threat emitters.

Providing information to the EA aircrew related to detected threat emitters not currently assigned a jamming approach is critical to overall situational awareness. FIG. 12 represents the scenario in which threat emitter 1250 has been defined by the EA 1230 and an assessment of PE 1220 vulnerability has been made along flight path 1240. At this point threat emitter 1250 has not been assigned a jamming approach, as indicated by the dashed segment 1260. At a glance, EA 1230 is able to determine that threat emitter 1250 is a threat that requires EA 1230 jamming or that flight path 1240 needs to be altered to avoid detection.

The aircrew controls the display format posted by the aircraft display processor via designated aircraft interfaces. Depending on the need, the aircrew display options include the JAR contours, the JAS or a combined JAR JAS display format. The software algorithm and method described above is suitable for implementation upon any number of electronic warfare systems and architectures. It is not necessary to limit the implementation of the preferred embodiment to currently existing aircraft computers, aircraft interfaces or electronic warfare capabilities.

What is claimed is:

1. A method of assessing the effectiveness of jamming provided by an electronic warfare platform, said method comprising:

determining a radar coverage volume for a threat emitter system detected by said electronic warfare platform using an electronic warfare system residing within said electronic warfare platform wherein said radar coverage volume defines a maximum threat range and a boundary for a scan volume;

invoking a jam assessment software program using as an input a set of characteristics particular to a waveform radiated by said threat emitter system to first calculate an in alignment range corresponding to a main beam coverage volume for said threat emitter system in the presence of jamming by said electronic warfare platform, to second calculate a side lobe range corresponding to a side lobe coverage volume for said threat emitter system in the presence of jamming by said electronic warfare platform and to third calculate an out of alignment range corresponding to an out of alignment coverage volume for said threat emitter system in the presence of jamming by said electronic warfare platform where said algorithm uses results from said first, said second and said third calculation to generate a jam acceptability region;

comparing said radar coverage volume to a position of a protected entity for determining if said position of said protected entity lies within said radar coverage volume;

generating a user display within said electronic warfare system depicting an effectiveness cue corresponding to results from the comparison of said radar volume to the position of said protected entity, and results from invoking said jam assessment software program where said effectiveness cue is used to assess an impact upon the capability of said threat emitter system to detect said protected entity.

2. The method of claim 1 wherein said jam assessment software program includes a jammer and tactics optimization equation.

3. The method of claim 1 wherein said set of characteristics reside in a plurality of fields within an electronic library.

4. The method of claim 1 wherein said user display is further comprised of a set of segmented and color coded jam assessment strobes wherein said color code corresponds to said electronic warfare platform effectiveness in preventing detection of said protected entity and said segment length corresponds to a diminished range for a jammed threat emitter system.

5. The method of claim 1 wherein said electronic warfare system detects a plurality of threat emitter systems for use in determining a plurality of said jam acceptability regions using as inputs a set of characteristics particular to waveforms radiated by said threat emitter systems.

6. A method of assimilating information associated with a plurality of detected threat emitter systems and assessing the effectiveness of jamming provided by an electronic warfare system, said method comprising:

detecting a threat emitter waveform emanating from said threat emitter system using said electronic warfare system;

determining a radar coverage volume for said threat emitter waveform using said electronic warfare system wherein said radar coverage volume defines a maximum threat range for said threat emitter waveform and a boundary for a scan volume of said threat emitter waveform;

comparing said radar coverage volume to a position of a protected entity for determining if said position of said protected entity lies within said radar coverage volume;

determining a relative bearing between said threat emitter system, said electronic warfare platform and said protected entity using a location for said threat emitter system, a location for said electronic warfare system and said position of said protected entity;

executing a jam assessment software program having as input a set of characteristics particular to said threat emitter waveform detected by said electronic warfare platform, said relative bearing and said radar coverage volume where said jam assessment software program is executed by said electronic warfare system;

generating a user display within said electronic warfare system depicting an effectiveness cue corresponding to results from the comparison of said radar volume to the position of said protected entity, and results from invoking said jam assessment software program where said effectiveness cue is used to assess an impact upon the capability of said threat emitter system to detect said protected entity.

7. The method of claim 6 wherein said jam assessment software program includes a jammer technique optimization power equation to first calculate an in alignment range corresponding to a main beam coverage volume for said threat emitter waveform in the presence of jamming by said electronic warfare platform, to secondly calculate a side lobe range corresponding to a side lobe coverage volume for said threat emitter waveform in the presence of jamming by said electronic warfare platform and to thirdly calculate an out of alignment range corresponding to an out of alignment coverage volume for said threat emitter waveform in the presence of jamming by said electronic warfare platform where said algorithm uses results from said first, said second and said third calculation to generate a jam acceptability region.

8. The method of claim 7 wherein said jam assessment software program determines an overlap region for a plurality of said jam acceptability regions by identifying points in common between said plurality of jam acceptability regions and grouping said points in common into a set of points that define said overlap region.

9. The method of claim 6 wherein said user display is further comprised of a set of segmented and color coded jam assessment strobes wherein said color code corresponds to said electronic warfare platform effectiveness in preventing detection of said protected entity and said segment length corresponds to a diminished range for a jammed threat emitter system.

10. The method of claim 6 wherein said user displays are three dimensional.

11. A computerized method of assimilating information associated with a plurality of detected threat emitter systems and assessing the effectiveness of jamming provided by an electronic warfare system, said method comprising:

detecting a threat emitter waveform emanating from said threat emitter system using said electronic warfare system;

reading a first plurality of fields containing information describing operational characteristics corresponding to each threat emitter system expected to be encountered in a theater of operation where said first plurality of fields resides within an electronic library;

reading a second plurality of fields containing information describing a set of locations corresponding to each threat emitter system expected to be encountered in a theater of operation where said second plurality of fields resides within said electronic library;

determining a coverage volume for said threat emitter waveform wherein said coverage volume defines a maximum detection range for said threat emitter waveform, a boundary for a scan volume for said threat emitter waveform using said information from said first and said second plurality of fields read from said electronic library;

reading a third plurality of fields containing information describing operating characteristics of said electronic warfare system residing in said electronic library;

receiving a first set of navigational information describing a position and course of said electronic warfare system;

receiving a second set of navigational information describing a position and course of a protected entity;

comparing said coverage volume to said position of said protected entity for determining if said position of said protected entity lies within said coverage volume;

determining a relative bearing between said threat emitter system, said electronic warfare system and said protected entity using said location of said threat emitter system, said first set of navigational information and said second set of navigational information;

setting a first conditional marker indicating that said relative bearing is in alignment when said protected entity location and said location of said electronic warfare system are in a main beam coverage volume of said threat emitter waveform;

setting a second conditional marker indicating that said relative bearing is in side lobe alignment when said protected entity location and said location of said electronic warfare system are in a side lobe coverage volume of said threat emitter waveform;

setting a third conditional marker indicating that said relative bearing is out of alignment when said protected entity location and said location of said electronic warfare system are outside of said main lobe coverage volume and outside of said side lobe of said threat emitter waveform;

invoking a reactive assignment algorithm using the information contained in said first, said second and said third conditional markers to select a first jamming waveform to prevent detection of said protected entity by said threat emitter system when said detected threat emitter waveform is unexpected;

invoking a preemptive assignment algorithm using the information contained in said first, said second and said third conditional markers to select a second jamming waveform to prevent detection of said protected entity by said threat emitter system when said detected threat emitter waveform is expected; and generating a user display within said electronic warfare system depicting the effectiveness of said first jamming waveform and said second jamming waveform employed to prevent detection of said protected entity.

12. The method of claim 11 wherein said reactive assignment algorithm invokes a jammer technique optimization power equation to first calculate an in alignment range corresponding to a main beam coverage volume in the presence of jamming by said electronic warfare platform, to secondly calculate a side lobe range corresponding to a side lobe coverage volume in the presence of jamming by said electronic warfare platform and to thirdly calculate an out of alignment range corresponding to an out of alignment coverage volume in the presence of jamming by said electronic warfare platform where said algorithm uses results from said first, said second and said third calculation to generate a jam acceptability region.

13. The method of claim 12 wherein a first overlap region for a first plurality of jam acceptability regions are determined by identifying points in common between said first plurality of jam acceptability regions and grouping said points in common into a set of points that define said first overlap region.

14. The method of claim 11 wherein said preemptive assignment algorithm invokes a jammer technique optimization power equation to first calculate an in alignment range corresponding to a main beam coverage volume in the presence of jamming by said electronic warfare platform, to secondly calculate a side lobe range corresponding to a side lobe coverage volume in the presence of jamming by said electronic warfare platform and to thirdly calculate an out of alignment range corresponding to an out of alignment coverage volume in the presence of jamming by said electronic warfare platform where said algorithm uses results from said first, said second and said third calculation to generate a jam acceptability region.

15. The method of claim 14 wherein a second overlap region for a second plurality of jam acceptability regions are determined by identifying points in common between said second plurality of jam acceptability regions and grouping said points in common into a set of points that define said second overlap region.

16. The method of claim 11 wherein said user display is further comprised of a set of segmented and color coded jam assessment strobes wherein said color code corresponds to said electronic warfare platform effectiveness in preventing detection of said protected entity and said segment length corresponds to a diminished range for a jammed threat emitter system.

17. The method of claim 11 wherein said user displays are two dimensional.

18. The method of claim 11 wherein said user displays are three dimensional.

* * * * *